J. F. BROWN.
PISTON.
APPLICATION FILED JAN. 28, 1916.

1,226,459.

Patented May 15, 1917.

Witnesses

Inventor
J. F. Brown,
By
Attorney

UNITED STATES PATENT OFFICE.

JOHN F. BROWN, OF PROVIDENCE, RHODE ISLAND.

PISTON.

1,226,459. Specification of Letters Patent. Patented May 15, 1917.

Application filed January 28, 1916. Serial No. 74,833.

*To all whom it may concern:*

Be it known that I, JOHN F. BROWN, a citizen of the United States, residing at Providence, in the county of Providence and State of Rhode Island, have invented certain new and useful Improvements in Pistons; and I do hereby declare the following to be a full, clear, and exact description of the invention, such as will enable others skilled in the art to which it appertains to make and use the same.

This invention relates to pistons, and more particularly to a piston particularly designed for use in connection with internal combustion engines.

The invention has for its object to provide an improved piston embodying a cylindrical body and a removable head plate particularly designed for use in connection with internal combustion engines having removable cylinder heads, whereby the cylinder and piston heads may be removed so as to render the bearings of the wrist pins accessible for adjustment and other purposes.

Another object is the provision of a piston having a removable head whereby the wrist pin bearing may be disassembled so as to permit of the removal of the piston from the upper or closed end of the cylinder for adjustment or replacing of the piston rings.

Figure 1:
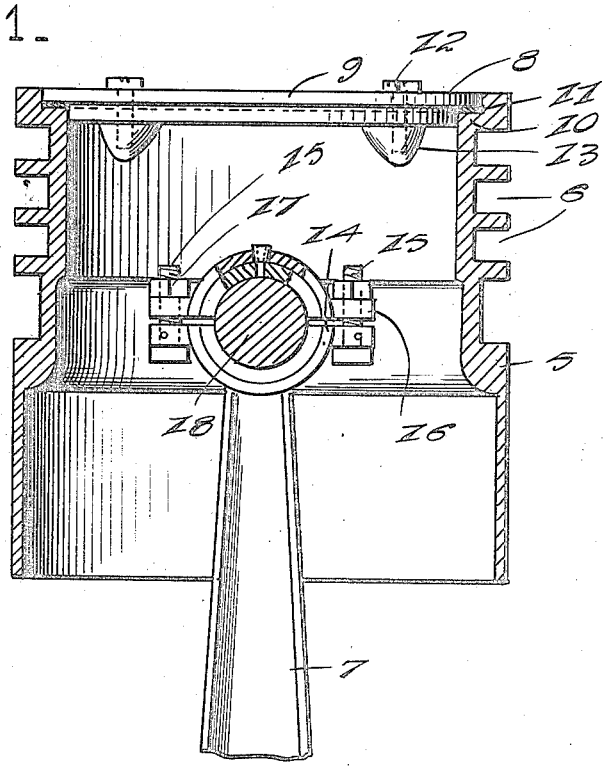
Figure 2:
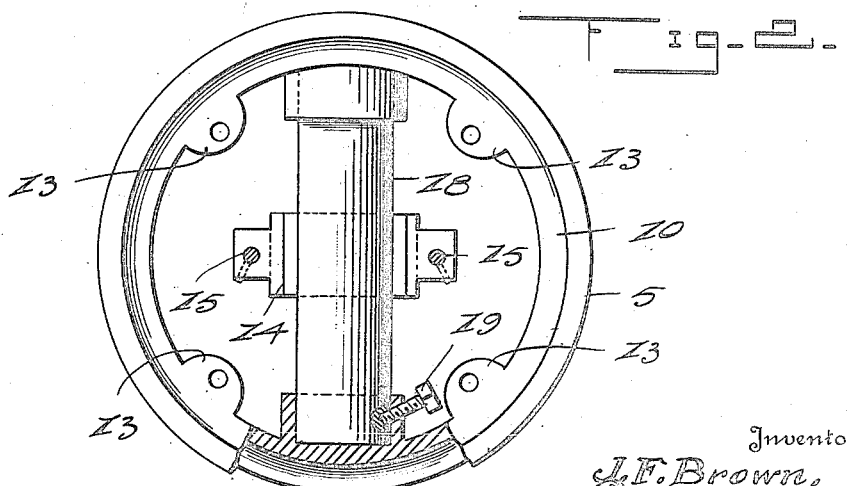

With these and other objects in view, the invention consists in the novel construction, combination and arrangement of parts as will be hereinafter specifically described, claimed and illustrated in the accompanying drawing, in which:

Figure 1 represents a longitudinal sectional view through the improved piston, partly broken away, Fig. 2 represents a plan view, partly in section, the piston head plate being removed.

Referring to the drawing in detail, wherein similar reference numerals designate corresponding parts throughout the several views, the numeral 5 indicates generally a hollow cylindrical shell constituting the body of the piston having the usual grooves 6 formed in the circumferential face thereof for receiving piston rings (not shown). The lower end of the piston body 5 is open to accommodate the oscillatory movement of the connecting rod 7 and the upper end thereof is closed by a removable head plate 8, having a circumferential flange 9 engaged in an annular recess 10 formed internally of the upper open end of the body 5. A gasket 11 is interposed between the flange 9 and the wall of the recess 10 to insure against leakage.

The head 8 is rigidly secured in position in the body 5 by a plurality of bolts 12, having threaded shanks extending through apertures formed in the head 8 and fitted in internally screwthreaded apertures formed in ears 13 formed integral with the inner surface of the body 5.

The lower part of the wrist pin bearing, designated generally by the numeral 14, is carried by the upper extremity of the connecting rod 7, while the other bushing is secured in adjusted position with relation to the lower bushing by bolts 15 positioned through apertures formed in the spaced parallel ends 16 of the bearing members, and having nuts 17 threaded upon the upper extremities thereof, whereby the nuts may be adjusted or removed by a tool inserted through the top of the piston body 5, subsequent to removal of the head plate 9.

The wrist pin bearing 14 incloses the wrist pin 18 mounted diametrically within the body 5 and rigidly secured therein by a screw 19. The piston herein described is particularly designed for use in connection with internal combustion engines having removable cylinder heads, so that, upon removal of the cylinder heads, the bolts 12 fastening the head plate 8 in position are accessible and may be conveniently removed to expose the nuts 17 securing the bearing members 14 in position.

What I claim is:

1. A piston including a hollow cylindrical body, a head plate detachably connected therewith, a wrist pin supported in said body, a connecting rod, a separable bearing connecting said connecting rod with said wrist pin and removable through the end of the body carrying said head plate.

2. A piston including a hollow cylindrical body, a head plate removably engaged in said body, means for removably securing said head in position in one end of said body, a wrist pin connected with said body, a connecting rod engaged with said wrist pin, a bearing member securing said connecting rod to said wrist pin and removable through the head end of said body.

3. A piston including a hollow cylindrical body, a wrist pin mounted in said body, means securing said wrist pin in position in said body, a connecting rod extending through one end of said body, a bearing carried by said connecting rod and engaged with said wrist pin removable through the opposite end of said body, and a removable head secured at one end to said body.

4. A piston including a hollow cylindrical body, a wrist pin secured diametrically within said body, a connecting rod projecting from one end of said body, a bearing carried by said connecting rod and positioned upon said wrist pin and removable through the opposite end of said body, a head plate engaged with the end of said body opposite said connecting rod, and means removably securing said head in position.

5. A piston including a hollow body having open ends, a wrist pin supported in said body, a connecting rod engaged with said wrist pin and projecting through one end of said hollow body, a bearing member detachably connected with said connecting rod and securing the latter in position on said wrist pin and removable through the opposite end of said hollow body, and a head plate detachably secured to the last mentioned end of said hollow body.

In testimony whereof I affix my signature in presence of two witnesses.

JOHN F. BROWN.

Witnesses:
HENRY L. BURTON,
RALPH E. NAYLOR.